(12) United States Patent
Loacker et al.

(10) Patent No.: US 11,267,354 B2
(45) Date of Patent: Mar. 8, 2022

(54) POWER SUPPLY

(71) Applicant: DESIGNWERK TECHNOLOGIES GmbH, Winterthur (CH)

(72) Inventors: Frank Loacker, Pfungen (CH); Vivien Dettwiler, Hochwand (CH)

(73) Assignee: DESIGNWERK TECHNOLOGIES GMBH, Winterthur (CH)

( * ) Notice: Subject to any disclaimer, the term of this patent is extended or adjusted under 35 U.S.C. 154(b) by 259 days.

(21) Appl. No.: 16/543,100

(22) Filed: Aug. 16, 2019

(65) Prior Publication Data
US 2021/0046834 A1 Feb. 18, 2021

(51) Int. Cl.
*B60L 53/30* (2019.01)
*H02J 7/00* (2006.01)

(52) U.S. Cl.
CPC ............ *B60L 53/30* (2019.02); *H02J 7/0042* (2013.01); *B60Y 2200/91* (2013.01); *B60Y 2300/91* (2013.01)

(58) Field of Classification Search
CPC .... B60L 53/30; H02J 7/0042; B60Y 2200/91; B60Y 2300/91
USPC ........................................................ 320/109
See application file for complete search history.

(56) References Cited

U.S. PATENT DOCUMENTS

| | | | |
|---|---|---|---|
| 5,879,831 A * | 3/1999 | Ovshinsky | H01M 50/317 429/54 |
| 6,255,015 B1 * | 7/2001 | Corrigan | H01M 50/528 429/149 |
| 6,372,377 B1 * | 4/2002 | Ovshinsky | H01M 50/543 429/66 |
| 10,347,880 B2 * | 7/2019 | Kim | H01M 10/625 |
| 10,446,890 B2 * | 10/2019 | Yoshida | H01M 10/6556 |
| 10,770,693 B2 * | 9/2020 | Nicholls | H01M 10/613 |
| 10,790,489 B2 * | 9/2020 | Lampe-Onnerud | H01M 10/0525 |
| 10,797,285 B2 * | 10/2020 | Hilligoss | H01M 10/48 |
| 10,856,445 B2 * | 12/2020 | Murakami | H05K 5/0217 |
| 10,873,111 B2 * | 12/2020 | Melack | H01M 10/647 |
| 2004/0247969 A1 * | 12/2004 | Faris | H01M 12/06 429/406 |

(Continued)

FOREIGN PATENT DOCUMENTS

| | | |
|---|---|---|
| CN | 107284211 A | 10/2017 |
| CN | 207368041 U | 5/2018 |

(Continued)

OTHER PUBLICATIONS

Co-pending U.S. Appl. No. 16/544,222, Loacker, "Battery Pack," filed Aug. 19, 2019.

(Continued)

*Primary Examiner* — Suresh Memula
(74) *Attorney, Agent, or Firm* — Pauley Erickson & Swanson

(57) ABSTRACT

A power supply with an inner housing including a first plate and a second plate arranged spaced apart from each other. The inner housing further includes a channel comprising at least one channel side wall encompassing a channel passage extends in a longitudinal direction between a first plate opening arranged at the first plate and a second plate opening arranged at the second plate. At least one electronic component of the power supply is thermally coupled to the channel side wall.

14 Claims, 3 Drawing Sheets

(56) References Cited

U.S. PATENT DOCUMENTS

| | | | |
|---|---|---|---|
| 2007/0193280 A1* | 8/2007 | Tuskiewicz | F25D 29/00 62/3.6 |
| 2007/0259258 A1* | 11/2007 | Buck | H01M 10/6554 429/120 |
| 2010/0039771 A1* | 2/2010 | Marchand | H05K 7/20909 361/694 |
| 2010/0273042 A1* | 10/2010 | Buck | H01M 50/20 429/120 |
| 2011/0076540 A1* | 3/2011 | Ronning | H01M 10/617 429/120 |
| 2012/0009451 A1* | 1/2012 | Yoo | H01M 50/166 429/94 |
| 2012/0085743 A1 | 4/2012 | Clauss et al. | |
| 2013/0032310 A1* | 2/2013 | Jaena | F28D 15/02 165/104.25 |
| 2013/0273829 A1* | 10/2013 | Obasih | H01M 10/6551 454/284 |
| 2014/0087231 A1* | 3/2014 | Schaefer | H01M 50/24 429/120 |
| 2015/0037648 A1* | 2/2015 | Nguyen | H01M 10/613 429/120 |
| 2015/0255837 A1* | 9/2015 | Larsson | H01M 10/0481 429/120 |
| 2016/0036101 A1* | 2/2016 | Nishimura | H01M 50/20 429/120 |
| 2016/0054069 A1* | 2/2016 | Armsden | B21D 53/085 165/173 |
| 2016/0193933 A1* | 7/2016 | Jiang | B60L 53/305 320/109 |
| 2016/0264018 A1* | 9/2016 | Choufany | B60K 1/04 |
| 2017/0162923 A1* | 6/2017 | Deng | H01M 10/486 |
| 2017/0279172 A1* | 9/2017 | Tucker | H01M 10/6568 |
| 2018/0013105 A1* | 1/2018 | Wuensche | H01M 50/256 |
| 2018/0026320 A1* | 1/2018 | Poirier | H01M 10/625 429/100 |
| 2018/0062225 A1* | 3/2018 | You | H01M 50/20 |
| 2018/0156494 A1 | 6/2018 | Bohlender et al. | |
| 2018/0248239 A1* | 8/2018 | Nam | H01M 10/6566 |
| 2019/0140229 A1* | 5/2019 | Lindstrom | H01M 50/20 |
| 2019/0232794 A1* | 8/2019 | Sparks | B60L 53/16 |
| 2020/0112071 A1* | 4/2020 | Geskes | H01M 10/625 |
| 2020/0161721 A1* | 5/2020 | Wang | H01M 10/6567 |
| 2020/0164758 A1* | 5/2020 | Flechl | B60L 53/35 |
| 2020/0395604 A1* | 12/2020 | Takahashi | C01G 51/00 |
| 2021/0057708 A1* | 2/2021 | Castillo | B60K 1/04 |

FOREIGN PATENT DOCUMENTS

| | | |
|---|---|---|
| CN | 109677253 A | 4/2019 |
| CN | 208812975 U | 5/2019 |
| CN | 208881608 U | 5/2019 |
| CN | 109955704 A | 7/2019 |
| DE | 10 2017 214 023 A1 | 2/2019 |
| EP | 3 327 821 A1 | 5/2018 |

OTHER PUBLICATIONS

Co-pending U.S. Appl. No. 16/586,399, Loacker, "Electric Truck," filed Sep. 27, 2019.

Co-pending U.S. Appl. No. 16/545,960, Loacker, "Drivetrain," filed Aug. 20, 2019.

* cited by examiner

POWER SUPPLY

BACKGROUND OF THE INVENTION

Field of the Invention

The present invention relates to a portable power supply for charging of an electric vehicle.

Discussion of Related Art

From the prior art, different types of power supplies for charging of electric vehicles are known.

CN208881608U by Dongguan City Light Ye Energy Technology Co was published on 21, May 2019. It discloses an electric vehicle integrated mobile charging device, comprising a base plate and the operation panel is fixed to the front door. The disclosed device further comprises a bottom plate to which rollers are mounted so that the device can move freely, to place it in a cool and safe place.

CN208812975U by Chongqing College of electronic Engineering was published on 3, May 2019. This document discloses an electric vehicle power supply device, and includes a device housing, vents, a lithium battery, a control box, a controller and heat dissipation holes.

SUMMARY OF THE INVENTION

It is an object of the invention to improve the state of the art in the field of portable power supplies for charging of electrical vehicles.

A preferred variation of the disclosure is directed to a portable power supply for charging of an electric vehicle. The power supply usually comprises an inner housing comprising a first plate and a second plate arranged spaced apart from each other. The first and the second plate are preferably arranged parallel to each other. A channel comprising at least one channel side wall encompassing a channel passage extends in a longitudinal direction between a first plate opening arranged at the first plate and a second plate opening arranged at the second plate. Usually the channel comprises two channel side walls arranged opposite to each other. The first plate and the second plate in combination with the channel preferably form part of a main supporting structure of the power supply. The main supporting structure can further comprise rods detachably interconnecting the first plate and the second plate.

At least one electronic component of the power supply is thermally coupled to at least one channel side wall. Good results can be achieved when electronic components are arranged at two channel side walls and at least one electronic component is thermally coupled to the each of the two channel side walls. The thermal coupling of the channel side wall and the at least one electronic component is preferably realized by a planar contact area between the channel side wall and the at least one electronic component. Preferably an outer housing extends between the first plate and the second plate encompassing the at least one electronic component. The outer housing protects the electronic components by forming an environmentally sealed compartment together with the inner housing. In other words, the inner housing and the outer housing form an environmentally sealed compartment within the at least one electronic component can be accommodated. The outer housing can be of a multi-part design allowing to dismount the outer housing partially for easy access to electronic components inside the environmentally sealed compartment.

The power supply may additionally or alternatively be equipped with a liquid cooling system at least partially arranged in the channel. The cooling system can comprise a cooling circuit of thermal exchange fluid and at least one cooling plate forming part of the cooling circuit. The cooling plate is preferably thermally coupled to the at least one electronic component. The cooling thermal plate may comprise at least one fluid channel for the thermal exchange fluid to flow through.

In a variation of the power supply at least one electrical interface may be arranged at the outer housing. By means of at least one electrical interface the power supply can be connected to an electric vehicle and/or an electric supply network. Favorably the electrical interface comprises two electrical connector halves are arranged at the outer housing of the power supply. A first electrical connector to connect to the electric vehicle and a second electrical connector to connect to the electric supply network simultaneously.

Favorably at least one thermal exchange rib is arranged inside the channel integrally forming part or thermally coupled to at least one channel side wall, in order to increase the surface for thermal exchange. The at least one thermal exchange rib may be arranged inside the channel passage.

The first plate opening and/or the second plate opening can extend into a pre-chamber arranged in a pre-chamber housing. The pre-chamber housing may comprise a frame-like support structure. At least one pre-chamber housing connects to the first and/or the second end plate. This has the advantage that at least one ventilator can be arranged in at least one pre-chamber housing. By means of the at least one ventilator air can be moved between the first plate opening and the second plate opening through the channel passage in order to facilitate an efficient thermal exchange between the air and the channel side walls and the at least one thermal exchange rib respectively. Good results can be achieved when at least one ventilator cowl extending from the ventilator to the first plate opening and/or the second plate opening is arranged in at least one pre-chamber housing. In addition, or alternatively at least one ventilator may be arranged in front of the first plate opening and/or the second plate opening. The ventilator rotation axis is preferably parallel to the longitudinal direction of the power supply.

At least one pre-chamber housing acts as a stand by providing at least one stand area. The power supply may be placed on the floor with a stand area. Air inlets are arranged laterally at at least one pre-chamber housing. The air inlets connecting the outside and at least one pre-chamber. Preferably the air inlets are arranged laterally and radial circumferential at at least one pre-chamber housing. This allows an operation of the power supply in multiple orientations in relation to a ground surface it can be placed on. In other words, when the power supply stands on a ground surface, there are air inlets which are not blocked and an efficient cooling can be ensured.

The arrangement of the electronic components around the at least one channel, via which the necessary cooling can be provided, is compact as the space inside the environmentally sealed compartment is efficiently used. This compact construction leads to the light and therefore portable power supply without the need for wheels as used by power supplies from the prior art.

If appropriate an operating panel can be arranged at the pre-chamber housing. The operating panel may comprise controlling and/or monitoring means for controlling and/or monitoring the power supply. The controlling and/or monitoring means can be formed as a display and/or buttons and/or switches.

The disclosure may be summarized by the following clauses:

Clause 1: A portable power supply for charging of an electric vehicle comprising:

a. an inner housing comprising a first plate and a second plate arranged spaced apart from each other, and b. a channel comprising at least one channel side wall encompassing a channel passage extending in a longitudinal direction between a first plate opening arranged at the first plate and a second plate opening arranged at the second plate;

c. wherein at least one electronic component of the power supply is thermally coupled to the channel side wall.

Clause 2: The power supply according to clause 1, wherein an outer housing extends between the first plate and the second plate encompassing the at least one electronic component.

Clause 3: The power supply according to clause 2, wherein the inner housing and the outer housing form an environmentally sealed compartment.

Clause 4: The power supply according to at least one of the preceding clauses, wherein the channel comprises two channel side walls arranged opposite to each other, each channel side wall is thermally coupled to at least one electronic component.

Clause 5: The power supply according to at least one of the preceding clauses, wherein at least one thermal exchange rib is arranged inside the channel thermally coupled to the at least one channel side wall.

Clause 6: The power supply according to at least one of the preceding clauses, wherein the first plate and the second plate in combination with the channel form part of a main supporting structure of the power supply.

Clause 7: The power supply according to at least one of the preceding clauses, wherein the first plate opening and/or the second plate opening extend into a pre-chamber arranged in a pre-chamber housing.

Clause 8: The power supply according to clause 7, wherein the at least one pre-chamber housing connects to the first and/or the second end plate (3, 4).

Clause 9: The power supply according to clause 7 or 8, wherein at least one ventilator is arranged in at least one pre-chamber housing.

Clause 10: The power supply according to at least one of the preceding clauses, wherein at least one ventilator is positioned before the first plate opening and/or the second plate opening.

Clause 11: The power supply according to at least one of the preceding clauses 7 to 10, wherein air inlets are arranged laterally at at least one pre-chamber housing connecting the outside and at least one pre-chamber.

Clause 12: The power supply according to at least one of the preceding clauses 7 to 11, wherein at least one pre-chamber housing acts as a stand by providing at least one stand area.

Clause 13: The power supply according to at least one of the preceding clauses 7 to 12, wherein an operating panel is arranged at the pre-chamber housing, the operating panel may comprise controlling and/or monitoring means for controlling and/or monitoring the power supply.

Clause 14: The power supply according to at least one of the preceding clauses 2 to 13, wherein at least one electrical interface is arranged at the outer housing.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification.

The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
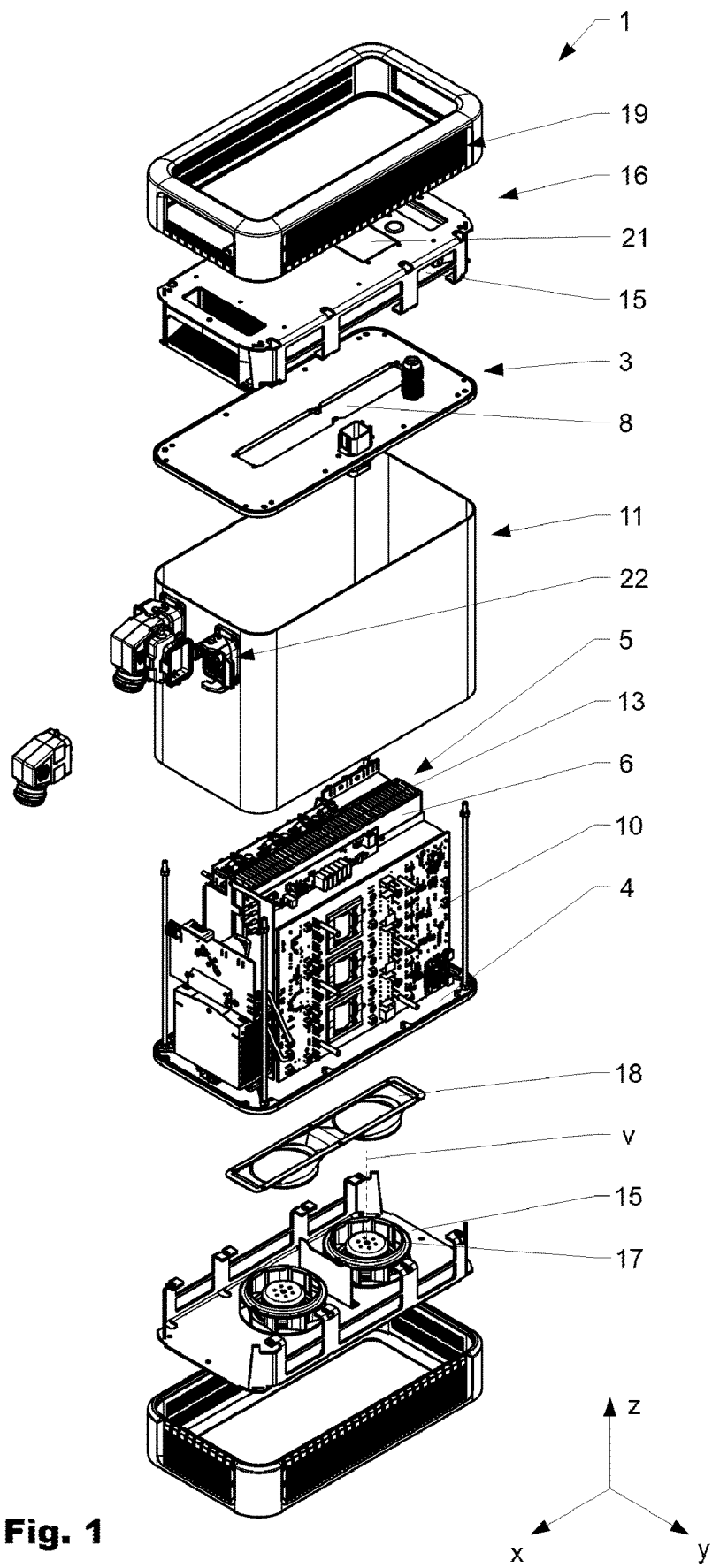
FIG. 1 shows a first variation of a power supply according to the disclosure in an exploded view.
Figure 4:
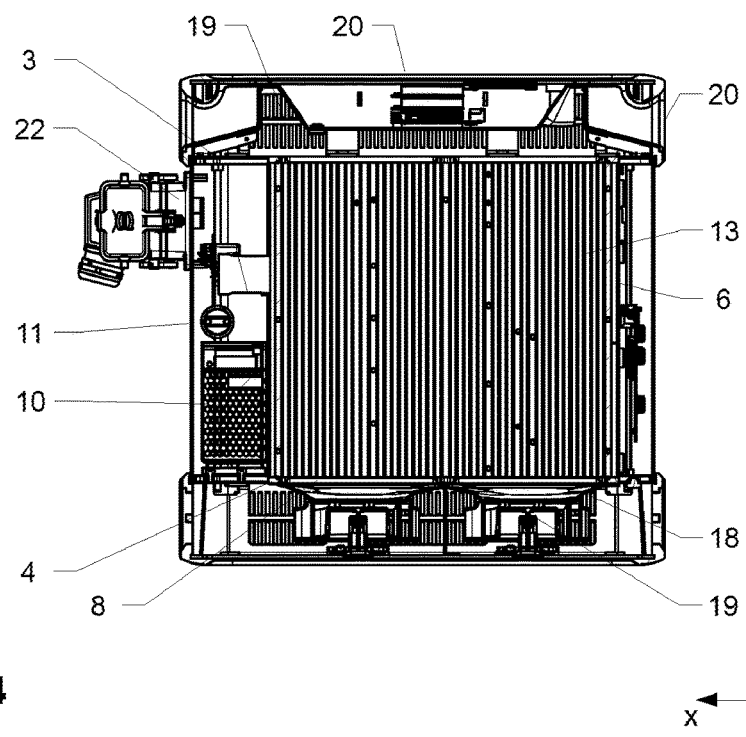
FIG. 4 is a cross-sectional view power supply of FIG. 2 indicated by line B in FIG. 2.
Figure 5:
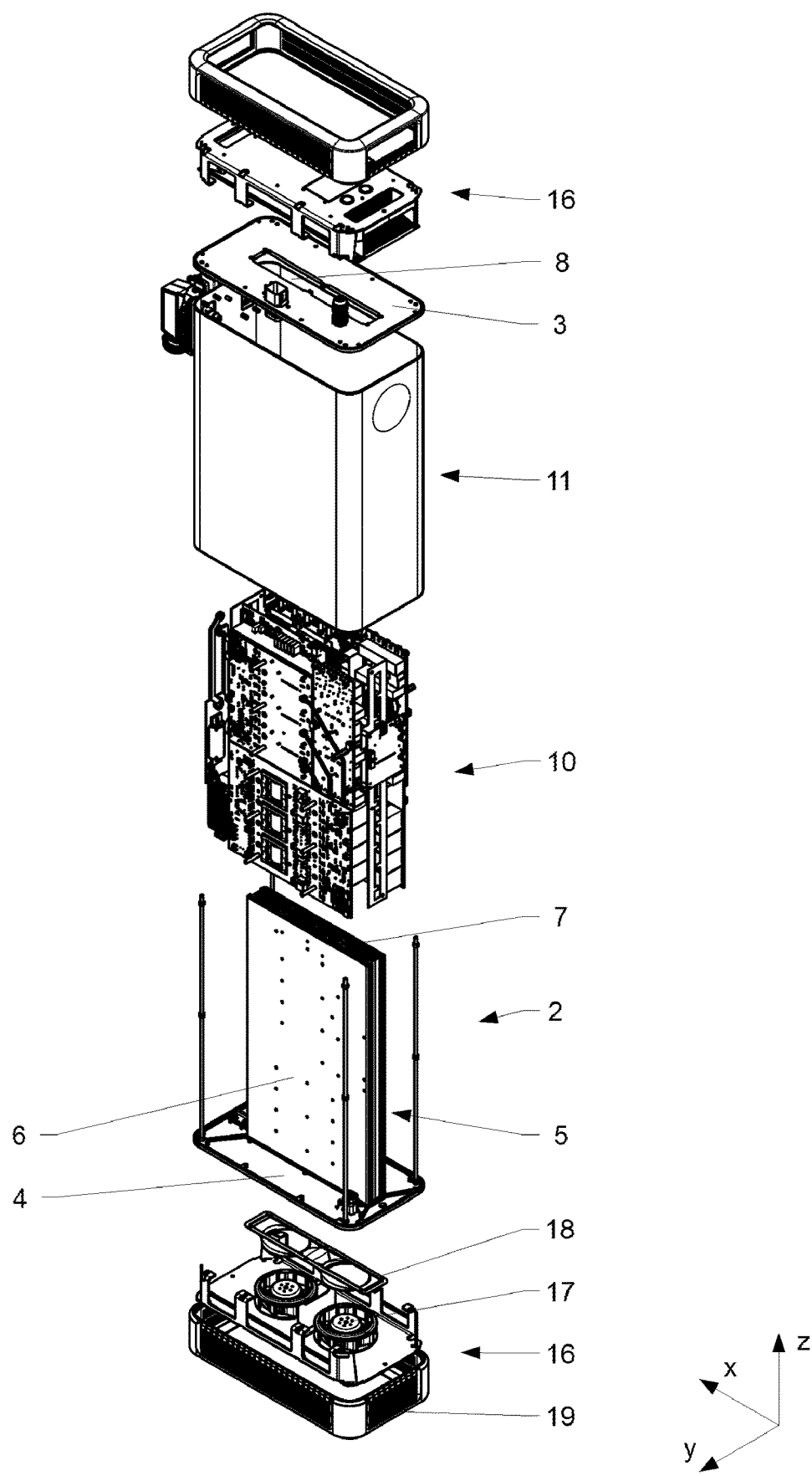
FIG. 5 is a second variation of a power supply according to the disclosure in an exploded view.

FIG. 1 and FIG. 5 show two variations of the disclosure directed to a power supply 1 for charging of an electric vehicle in an exploded view. The power supply 1 comprises an inner housing 2 which comprises a first plate 3 and a second plate 4 arranged spaced apart from each other. The first and the second plate 3, 4 are preferably arranged parallel to each other. A channel 5 comprising at least one channel side wall 6 encompassing a channel passage 7 extends in a longitudinal direction between a first plate opening 8 arranged at the first plate and a second plate opening 8 arranged at the second plate 4. In FIG. 1 to FIG. 5 the channel 5 comprises four channel side walls 6 arranged in two pairs of two channel side walls 6 each pair of side walls 6 are arranged opposite and parallel to each other. The inner housing 2 is mirror symmetrical in respect to a plane parallel to a pair of channel side walls 6 and centered between the channel side walls 6. One possible mirror plane can be seen in FIG. 2 with cross-sectional plane B.

The first plate 3 and the second plate 4 in combination with the channel 5 form part of a main supporting structure 2 of the power supply 1 as shown in FIG. 5. The main supporting structure 2 can further comprise rods interconnecting detachably the first and the second plate 3, 4.

Figure 2:
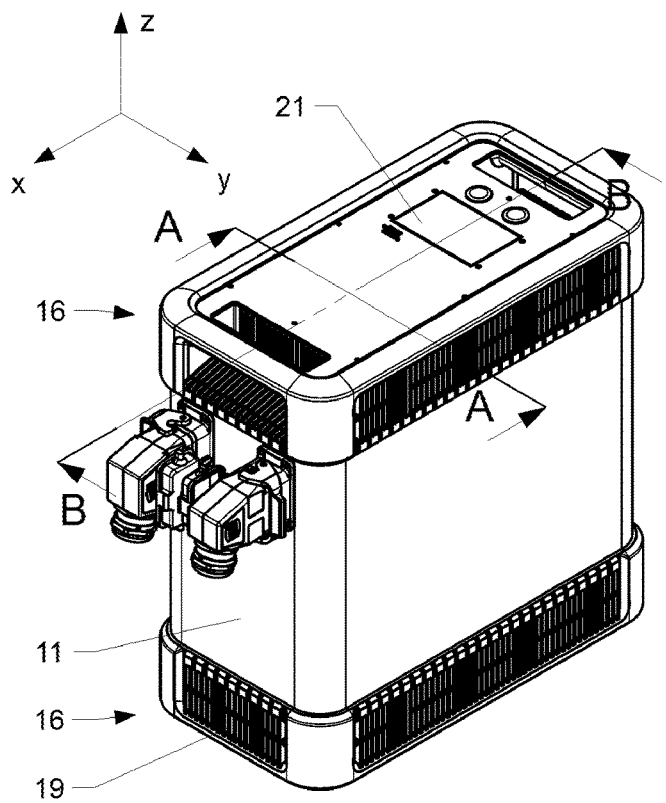
FIG. 2 shows the assembled power supply of FIG. 1 in a perspective view.
Figure 3:
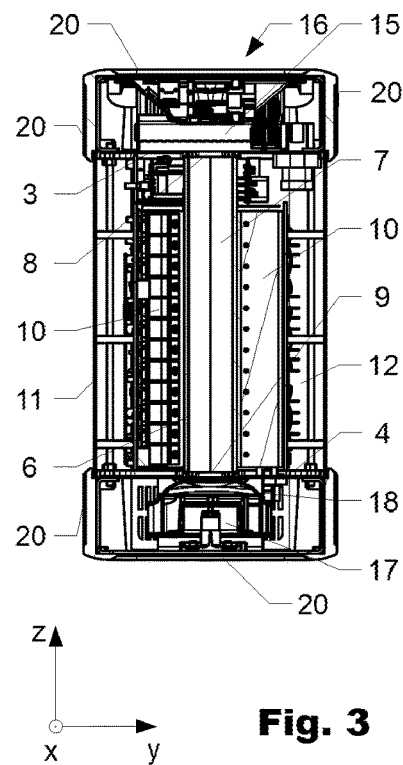
FIG. 3 is a cross-sectional view power supply of FIG. 2 indicated by line A in FIG. 2.

FIG. 1 and FIG. 3 show at least one electronic component 10 of the power supply 1 thermally coupled to at least one channel side wall 6. Good results can be achieved when electronic components 10 are arranged at two channel side walls 6 and at least one electronic component 10 is thermally coupled to the each of the two channel side walls 6. An outer housing 11 extends between the first plate 3 and the second plate 4 encompassing the at least one electronic component 10 this is illustrated in FIG. 2 and FIG. 3. The outer housing 11 protects the electronic components 10 by forming an environmentally sealed compartment 12 together with the inner housing 2. The inner housing 2 and the outer housing 11 encompass the environmentally sealed compartment 12 within which the electronic components 10 are accommodated. FIG. 3 further shows an extensive planar contact area of the electronic components 10 with the channel side wall 6.

FIG. 1 shows power supply 1 with an electrical interface 22 comprising two electrical connector halves 22. The two electrical connector halves 22 are arranged at the outer housing 11 of the power supply 1. One electrical connector to connect to the electric vehicle and the second electrical connector to connect to the electric supply network simultaneously. Also shown are the associated connector halves (without the usually attached cables) which are connected to the electrical connector halves 22 of the power supply 1 during operation.

The weight and the compact size of the variation of the power supply 1 from FIG. 1 allows it to be carried/transported by a single person.

FIG. 4 shows in addition at least one thermal exchange rib 13 arranged inside the channel passage 7 thermally coupled to the at least one channel side wall 6, in order to increase the surface for thermal exchange. In this case the thermal exchange rib 13 is interconnected to two opposing channel side walls 6.

The first plate opening 8 and/or the second plate opening 9 extend into a pre-chamber 15 arranged in a pre-chamber housing 16 as shown in FIG. 2 and FIG. 3. A pre-chamber housing 16 is attached to the first and the second end plate 3, 4. Two ventilators 17 are arranged in the pre-chamber housing 16, the pre-chamber housing 16 being connected to the second plate 4. During operation the ventilators 17 move air between the first plate opening 8 and the second plate opening 9 through the channel passage 7 in order to facilitate an efficient thermal exchange between the air and the channel side walls 6 and the thermal exchange ribs 13 respectively. In addition, a ventilator cowl 18 extending from both ventilators 17 to the second plate opening 9 is arranged in the pre-chamber housing 16 connected to the second plate 4. FIG. 1 shows further that the ventilators 17 are positioned before the first plate opening 8 and/or the second plate opening 9 and that the ventilator rotation axis V is parallel to the longitudinal direction Z of the power supply.

Heat originating from the electrical components 10 during operation of the power supply 1 transfers to the channel side wall 6 as the channel side wall 6 is thermally coupled to the electronic components 10. The heat transfers in addition into the thermal exchange rib 13. During operation air is moved through the channel passage 7 by means of two ventilators 17. The air moving through the channel passage 7 is heated and thereby transports heat away from the channel side wall 6 and the thermal exchange rib 13. The heated air flows out of the channel passage 7 into a pre-chamber 15 and from there out of the power supply 1 through air inlets 19.

As shown in FIG. 2 and FIG. 3 these air inlets 19 are arranged laterally at the pre-chamber housing 16. Furthermore, the pre-chamber housing 16 has multiple stand areas 20 onto which the power supply 1 can be propped up. Independent of the orientation in which the power supply 1 is placed onto a surface (e.g., a ground) at least some air inlets 19 are not blocked by the surface. This allows an efficient cooling of the electronic components 10 and therefore an operation of the power supply 1 in multiple orientations FIG. 1 and FIG. 2 show an operating panel 21 which is arranged at the pre-chamber housing. Through the operation panel 21 the power supply 1 can be controlled and/or monitored during operation. The operation panel 21 shown comprise a display for monitoring the power supply 1 and buttons for controlling the power supply 1.

The variations of the power supply 1 shown in FIG. 1 to FIG. 5 can charge with more than 10 kW (kilo Watts), preferably with more than 20 kW or 40 kW. Furthermore, the power supply 1 can operate from −20 degrees to +40 degrees Celsius.

Rather, the words used in the specification are words of description rather than limitation, and it is understood that various changes may be made without departing from the Spirit and scope of the invention.

LIST OF DESIGNATIONS

1 Power supply
2 Inner housing
3 First plate
4 Second plate
5 Channel
6 Channel side wall
7 Channel passage
8 First plate opening
9 Second plate opening
10 Electronic component
11 Outer housing
12 Environmentally sealed compartment
13 Thermal exchange rib
14 Main support structure
15 Pre-chamber
16 Pre-chamber housing
17 Ventilator
18 Ventilator cowl
19 Air inlets
20 Stand area
21 Operating panel
22 Electrical interface
Longitudinal direction (Z)
Ventilator rotation axis (V)

What is claimed:

1. A portable power supply (1) for charging of an electric vehicle comprising:
    a. an inner housing (2) comprising a first plate (3) and a second plate (4) arranged spaced apart from each other, and
    b. a channel (5) comprising at least one channel side wall (6) encompassing a channel passage (7) extending in a longitudinal direction (z) between a first plate opening (8) arranged at the first plate (3) and a second plate opening (9) arranged at the second plate (4);
    c. wherein at least one electronic component (10) of the power supply (1) is thermally coupled to the at least one channel side wall (6).

2. The power supply (1) according to claim 1, wherein an outer housing (11) extends between the first plate (3) and the second plate (4) encompassing the at least one electronic component (9).

3. The power supply (1) according to claim 2, wherein the inner housing (2) and the outer housing (11) form an environmentally sealed compartment (12).

4. The power supply (1) according to claim 1, wherein the channel (5) comprises two channel side walls (6) arranged opposite to each other, each channel side wall (6) is thermally coupled to at least one electronic component (9).

5. The power supply (1) according to claim 1, wherein at least one thermal exchange rib (13) is arranged inside the channel (5) thermally coupled to the at least one channel side wall (6).

6. The power supply (1) according to claim 1, wherein the first plate (3) and the second plate (4) in combination with the channel (5) form part of a main supporting structure (14) of the power supply (1).

7. The power supply (1) according to claim 1, wherein the first plate opening (8) and/or the second plate opening (9) extend into a pre-chamber (15) arranged in a pre-chamber housing (16).

8. The power supply (1) according to claim 7, wherein the at least one pre-chamber housing (16) connects to the first and/or the second end plate (3, 4).

9. The power supply (1) according to claim 7, wherein at least one ventilator (17) is arranged in at least one pre-chamber housing (16).

10. The power supply (1) according to claim 1, wherein at least one ventilator (17) is positioned before the first plate opening (8) and/or the second plate opening (9).

11. The power supply (1) according to claim 7, wherein air inlets (19) are arranged laterally at at least one pre-chamber housing (16) connecting the outside and at least one pre-chamber (15).

12. The power supply (1) according to claim 7, wherein at least one pre-chamber housing (16) acts as a stand by providing at least one stand area (20).

13. The power supply (1) according to 7, wherein an operating panel (21) is arranged at the pre-chamber housing (15), the operating panel (21) may comprise controlling and/or monitoring means for controlling and/or monitoring the power supply.

14. The power supply (1) according to claim 2, wherein at least one electrical interface (22) is arranged at the outer housing (11).

* * * * *